United States Patent Office 3,157,675
Patented Nov. 17, 1964

3,157,675
ESTERS OF THIONOPHOSPHORIC ACID WITH ACETAL-ALCOHOLS
Enrique R. Witt, Corpus Christi, Tex., assignor to Celanese Corporation of America, New York, N.Y., a corporation of Delaware
No Drawing. Filed July 19, 1960, Ser. No. 43,732
6 Claims. (Cl. 260—340.7)

This invention relates to thionophosphate esters. More particularly it relates to thionophosphate esters synthesized from polyhydric alcohols.

It is an object of this invention to provide a novel method for the production of thionophosphate esters from polyhydric alcohols.

It is another object of this invention to provide new and useful thionophosphate esters.

Other objects of this invention will be apparent from the following detailed description and claims, in which all proportions are given by weight unless otherwise specified and the term moles refers to molecular weights in grams.

In accordance with one aspect of this invention there is provided a process for producing new and useful thionophosphate ester compounds by first reacting polyhydric alcohols with phosphite triesters by ester interchange and then reacting the ester interchange reaction product with sulfur.

The process of this invention makes it possible to synthesize several novel compounds. One such group of compounds are the bridged-ring thionophosphates in which a carbon atom is joined to a phosphorus atom by three oxymethylene (—CH$_2$O—) groups thus:

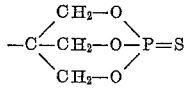

It will be seen that in these esters there are three six membered rings: one ring involving the two —CH$_2$O— groups shown at the upper and middle part of the formula; a second ring involving the middle and lower —CH$_2$O— groups; and a third ring involving the upper and lower —CH$_2$O— groups. Compounds of this nature may be obtained by reacting with sulfur the corresponding bridged ring phosphite esters, which are synthesized by a transesterification reaction between a phosphite triester such as triphenyl phosphite and a compound having a 1,1-di(hydroxymethyl)-2-hydroxyethyl group, that is, with a polyhydric alcohol having three methylol groups attached to a single carbon atom. Details of the production of the corresponding bridged ring phosphites are given in my copending application Serial No. 794,496, filed February 20, 1959, the entire disclosure of which is hereby incorporated by reference.

The transesterification reaction is preferably carried out in the presence of a transesterification catalyst, known in the art, at subatmospheric pressures preferably in the range of 10 to 760 mm. Hg and elevated temperatures suitably in the range of 75 to 250° C. Examples of thionophosphates which may be prepared in this manner are bridged ring trimethylolpropane thionophosphate, bridged ring trimethylolethane thionophosphate, and bridged ring pentaerythritol phosphate, of the formula

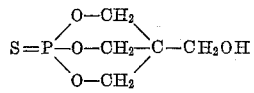

In the latter specific compounds the 1,1-di(hydroxymethyl)-2-hydroxy-ethyl group is attached to an ethyl, methyl, or hydroxymethyl radical, but this group may instead be attached to another radical or atom, such as another alkyl (e.g. butyl), hydrogen, an aryl radical (e.g. phenyl or benzyl), and amino group (e.g. to form the bridged ring thionophosphate of aminotrimethylolmethane) or a nitro group (e.g. to form the bridged ring thionophosphate of nitrotrimethylolmethane). Compounds having a plurality of 1,1-di(hydroxymethyl) - 2 - hydroxyethyl groups (e.g. dipentaerythritol) may be used to form thionophosphate containing a plurality of bridged ring thionophosphate groups. The bridged ring thionophosphates are useful pre-ignition inhibitors in leaded gasoline.

Another group of novel thionophosphate esters which may be produced in accordance with this invention are polymers, namely cross linked polythionophosphate esters containing thionophosphate groups, divalent radicals such as polymethylenes and polyalkylene ether radicals which have the formula —R$\pm$(OR$\pm$)$_n$ where R is an alkylene group and $n$ is a number at least one in value. These polymers also contain hydroxyl groups which act as chain terminators. These polymers may be conveniently shown structurally as follows:

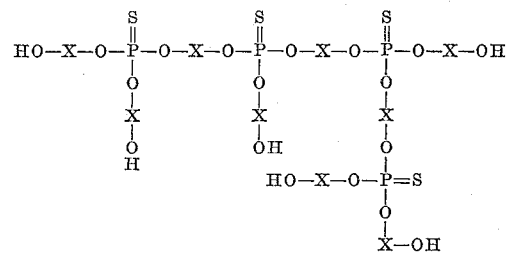

where X is the above described —R$\pm$(OR$\pm$)$_n$ or the polymethylene radicals. The lengths of the chains are determined by the random attachment of OH groups which act as chain terminators. If desired, the terminal OH groups may be etherified with alcohols such as butanol or esterified by means of acidic compounds such as acetic anhydride.

This novel crosslinked polythionophosphate ester is obtained by reacting with sulfur according to the process of this invention. According to said copending application, the corresponding polyphosphite esters may be prepared by a transesterification reaction of a phosphite triester such as an aryl phosphite, e.g. a triphenyl, tricresyl, or trixylenyl phosphite with a glycol, that is either an alkandiol or a glycol ether. The preferred triester is triphenyl phosphite as the phenol produced has the lowest boiling point and is therefore most easily removed by distillation. The transesterification process is quite similar to the previously described transesterification processes. It is preferably conducted in the presence of a transesterification catalyst such as metallic sodium, said catalyst preferably being present in quantities of less than 1% of the reaction mixture. The desirable pressures and temperatures which will, of course, depend on the boiling points of the alcohol and phosphite produced, may be, for example in the range of about 0 to 760 mm. Hg absolute and about room temperature to 300° C. respectively. As the pressures are subatmospheric, the distillation procedures involved may be referred as to vacuum distillations. The proportions of the reactants are preferably in the range of from 1.5 to 3 moles of glycol per mole of phosphite triester. Using these proportions, the polymer formed will be in the liquid state.

The glycols which may be used in the process of this invention include aliphatic glycols such as pentamethylene glycol, diethylene glycol, dipropylene and other polypropylene glycols, aromatic diols such as dihydroxymethyl benzene and aromatic glycol ethers such as dioxyethylol benzene.

For best results, glycols in which the hydroxyl groups are attached to carbons separated by at least 2 carbon atoms such as 1,4 and 1,5 glycols are preferred. In compounds in which the hydroxyl groups are closer together as 1,2 and 1,3 glycols polymerization is less extensive and is accompanied by undesirable cyclization.

Examples of the novel crosslinked polythionophosphates which may be prepared in accordance with this invention are polythionophosphate esters containing divalent monomers including polymethylenes such as pentamethylene, tetramethylene, and hexamethylene; polyalkylene ether radicals such as dipropylene and other polypropylene glycols and diethylene glycol.

The novel polythionophosphates of this invention are useful in polyurethane foam production. They react with diisocyanates to give polyurethanes incorporating phosphorus which confers a degree of flameproofing to the polyurethane.

According to further aspect of this invention novel thionophosphate esters containing at least one acetal ring may be prepared from initial polyhydric alcohol reactants by first reacting an alcohol containing at least 3 hydroxyl groups with a compound containing a carbonyl group such as an aldehyde or a ketone to form an acetal ring containing alcohol having the following structural formula:

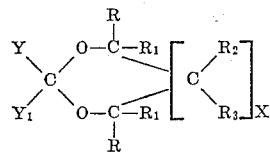

where R, $R_1$, $R_2$ and $R_3$ are members selected from the group consisting of hydrogen, alkyl, hydroxl and hydroxyalkyl radicals, there being present on the ring at least one hydroxyl or one hydroxy alkyl radical, X is O or a positive interger and Y and $Y_1$ are members selected from this group consisting of hydrogen, hydrocarbons and substituted hydrocarbon radicals. The acetal ring containing phosphite esters are prepared by a transesterification reaction of a phosphite triester such as an aryl phosphite with the above described acetal ring containing alcohol. Except for the reactants the transesterification process is essentially the same as that previously described. It is conducted in the presence of a transesterification catalyst, preferably present in quantities of less than 1% of the reaction mixture under pressures of 0 to 760 mm. Hg and temperatures in the range of room temperature to 300° C. The proportion of the reactants are preferably in the range of from 1 to 3 moles of acetal ring containing alcohol for each mole of phosphite triester. The extent of the ester interchange and consequently the nature of the acetal ring containing phosphite will vary with the amount of acetal ring containing alcohol reacted. For example, if one mole of the alcohol is reacted with one mole of the triphenyl phosphite, only one phenyl group in each molecule will be replaced by ester interchange. Thus, the product will be a diphenyl phosphite containing 1 acetal ring group. On the other hand, if 3 moles of the alcohol are reacted with 1 mole of triphenyl phosphite, all 3 phenyl groups in each molecule will be replaced to give a phosphite containing 3 acetal rings. The acetal ring containing phosphite ester produced is then reacted with sulfur according to the process of this invention to produce the novel acetal ring containing thionophosphate ester in which the acetal ring comprises a carbon atom linked to 2 oxygen atoms each of which is in turn linked to the opposite terminal atoms of a chain of at least 2 carbon atoms. One of the carbon atoms in the chain is linked to the phosphorus atom of the phosphate group through a linkage including one of oxygen atoms of said phosphate group. This phosphate ester may be shown structurally as follows:

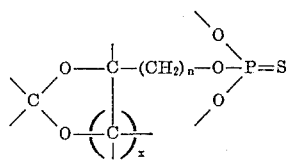

where $n$ is a number of 0 or greater value and $x$ is a number, at least 1 in value.

Among the alcohols containing at least 3 hydroxyl groups which may be used as initial reactants in this process are trimethylolpropane, trimethylolethane, pentaerythritol, erythritol, glycerol and inositol. The carbonyl group containing compound may be an aldehyde or ketone, saturated or unsaturated, e.g. crotonaldehyde, acetone, formaldehyde. Where monocrotylidene trimethylol propane or monocrotylidene trimethylol ethane are the acetal ring containing alcohols used, these alcohols may be prepared by reacting trimethylol ethane of propane in the presence of an acid catalyst at elevated temperature, preferably at the reflux temperature of the reaction mixture.

The preferred triester is triphenyl phosphite because of its low boiling point and the ease with which it may be removed by distillation.

Examples of the novel acetal ring containing thionophosphate esters which may be prepared in accordance with this invention are diphenyl-monocrotylidene trimethylol propane thionaphosphate, tris (monocrotylidene trimethylolpropane) thionophosphate, phenyl monocrotylidene pentaerythritol thionophosphate, tris (trimethylol propane formal) thionophosphate and tris (trimethylol propane acetal) thionophosphate.

While the reaction between sulfur and the phosphite esters is exothermic, in many cases the reaction is slow in commencing, and it is advantageous to heat the reaction mixture to temperatures advantageously in the range of from room temperature to 150° C. Once, however, the reaction commences, the application of heat is no longer necessary. Often the reaction is quite exothermic, and it is desirable to add the sulfur in small individual portions. There are substantially no limitations as to the pressures under which the sulfurphosphite ester reaction may take place. Accordingly, atmospheric pressure may be most conveniently used. While the reacted proportions of sulfur and phosphite ester are not critical, for best results sulfur in slight excess of one mole is reacted with on mole of the phosphite ester.

In addition to the individual uses disclosed, all of the thionophosphate esters of this invention are valuable gasoline additives acting to prevent motor rumble. The following example will further illustrate the practice of this invention:

EXAMPLE I

Bridged ring trimethylolpropane phosphite is prepared in accordance with the procedure set forth in copending application S. No. 794,496 by charging 536 parts (4 moles) of 1,1,1-trimethylolpropane, 1240 parts (4 moles) of triphenyl phosphite and 1 part of metallic sodium into a reactor fitted with a 20-tray distillation column. The mixture is maintained under a subatmospheric pressure of 44 mm. Hg A and heated. 80% of the distillate from the column is returned to the top of the column as reflux. The heating under the subatmospheric pressure is continued while distillation occurs. There is obtained 1065.7 parts of a first distillation cut, consisting of phenol, followed by 35.9 parts of an intermediate cut containing 11.9 parts of a phenol and 24.0 parts of bridged ring trimethylolpropane phosphite. The last cut, 585 parts, is bridged ring trimethylolpropane phosphite. To 1 mole of bridged ring trimethylolpropane phosphite dissolved in about 200 ml. of xylene, there is added 1.1 moles of sulfur. The reaction mixture is then heated to 120° C. at which point an exothermic reaction is noted. The reaction is allowed to continue until the sulfur disappears, usually from 10 to 30 minutes. A crystalline powder precipitates which is then separated by filtration. The crystals are washed with pentane. The product is trimethylolpropane thionophosphate. It has a melting point of 181.2–185.0° C.

EXAMPLE II

Following the procedure given in Example I, bridged ring pentaerythritol phosphite is synthesized from pentaerythritol and triphenyl phosphite. 172.1 g. (1.05 moles) of the bridged ring pentaerythritol phosphite and 32 g. (1 mole) of sulfur are mixed and heated to and maintained at 150° C. for 1 hour. Upon cooling the entire mass crystallized. The product is extracted with hot xylene from which the crystalline powder which forms on cooling is filtered off. The product is pentaerythritol thionophosphate.

EXAMPE III

First monocrotylidene trimethylolpropane was prepared as follows according to the procedure of copending application S. No. 822,210. 268 parts of trimethylolpropane (2 moles), 420 parts of crotonaldehyde (6 moles) and 3 parts of 85% phosphoric acid (0.03 mole) were stirred vigorously and heated at the boiling point, for 3 hours, in a vessel equipped with a decanter head and reflux condenser. During this three hour period 36 parts (2 moles) of water were removed while condensed water-immiscible material was continuously returned to the reaction mixture. The reaction mixture was then cooled and washed with 100 parts of a water solution containing 10 parts of sodium bicarbonate, to neutralize the catalyst. The washed material was again washed with 200 parts of water to effect further removal of salts.

The washed mixture was distilled at atmospheric pressure to remove unreacted crotonaldehyde as its water azeotrope overhead and the residue was then vacuum flashed at 2 mm. Hg A, with heating, until the base temperature reached 205° C. and the top temperature (vapor temperature) reached 170° C. The resulting flash distillate was then fractionated at 50 mm. Hg A to produce a colorless oily fraction boiling at 182–184° C. Tris (monocrotylidene trimethylolpropane) phosphite having the formula:

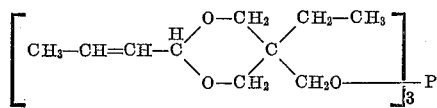

is then prepared by adding 1150 g. (6 moles) of the monocrotylidene trimethylol propane, 698 g. (2.26 moles) of triphenyl phosphite and 3 g. of metallic sodium to a reactor attached to a vacuum still. The phenol formed is then removed by vacuum stripping at subatmospheric pressure of 2 mm. Hg A and a pot temperature of 200° C. The residue is tris (monocrotylidene trimethylol propane) phosphite. Tris (monocrotylidene trimethylolpropane) thiophosphate having the formula:

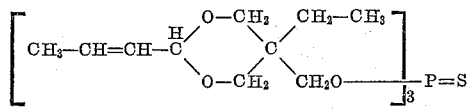

is then prepared by heating a mixture of 1 mole of tris (moncrotylidene trimethylol propane) phosphite and 1 mole of sulfur to 120° C. and maintaining the mixture at this temperature until the sulfur disappeared in the mixture (usually 5–10 minutes). After cooling, the reaction product is diluted with an amount of benzene to give a filterable solution and sulfur is then removed by filtration and 40 ml. of concentrated sodium carbonate solution is added. The product is then stripped of water and benzene to yield the thionophosphate ester.

EXAMPLE IV 1240 g. (4 moles of triphenyl phosphite, 2206 g. (9 moles) of dipropylene glycol and 2 g. of metallic sodium are reacted in a reactor attached to a vacuum still. The phenol formed is removed by vacuum stripping at a subatmospheric pressure of 2 mm. Hg A. and pot temperature of 170° C. The residue is a clear viscous pale yellow liquid substantially containing polyphosphite ester. The product is washed with a sodium carbonate-sodium bicarbonate solution and then stripped of water. The product is then diluted with toluene, filtered to remove insoluble salts and stripped of the toluene.

To 583.2 g. of the produced polyphosphite ester which contain 58.8 g. of phosphorus at 100° C., there is added in small portions 62 g. of sulfur (U.S.P. sublimed). The exothermic reaction is allowed to continue until all the sulfur has disappeared. The product is diluted with an amount of toluene at least equaling the weight of the product and 30 ml. of a concentrated sodium bicarbonate-sodium sulfate solution is added. The product is then stripped of the water and toluene. The dry product is then diluted with benzene and filtered to remove salts and then the benzene is removed by distillation. Polythionophosphate product has a specific gravity of 1.185 at 25°/4° C. A viscosity of 6000 cp. at 25° C. and a refractive index of 1.4931 at 25° C.

It is to be understood that the foregoing detailed description is merely given for purposes of illustration and that many variations may be made therein without departing from the spirit of this invention.

What is claimed is:

1. A thionophosphate of the formula:

$$\left[ CH_3-CH=CH-C\begin{matrix}H\\ \end{matrix}\begin{matrix}O-CH_2\\ O-CH_2\end{matrix}C\begin{matrix}CH_2CH_3\\ CH_2O\end{matrix} \right]_3 P=S$$

2. Phenyl monocrotylidene pentaerythritol thionophosphate.
3. Diphenyl, monocrotylidene trimethylolpropane thionophosphate.
4. Tris (trimethylolpropane formal) thionophosphate.
5. Tris (trimethylolpropane acetal) thionophosphate.
6. An ester of thionophosphoric acid with an acetal-alcohol which acetal-alcohol is the reaction product of:
   (1) a polyol selected from the group consisting of trimethylolpropane, trimethylolethane, pentaerythritol, erythritol, glycerol and inositol; and
   (2) a compound selected from the group consisting of formaldehyde, crotonaldehyde and acetone.

References Cited in the file of this patent

UNITED STATES PATENTS 2,847,443    Hechenbleikner et al. _____ Aug. 12, 1958
2,888,492    Fischer et al. _____ May 26, 1959

OTHER REFERENCES

Kosolapoff: Organo Phosphorous Compounds, pages 235–236 (1950), John Wiley and Sons, Inc.